(12) United States Patent
Klein et al.

(10) Patent No.: US 8,917,459 B2
(45) Date of Patent: Dec. 23, 2014

(54) ERGONOMIC VERTICAL VISION REDIRECTION

(75) Inventors: Eric A. Klein, San Francisco, CA (US); Adam Norton, Palo Alto, CA (US)

(73) Assignee: Eric A. Klein, San Francisco, CA (US)

( * ) Notice: Subject to any disclaimer, the term of this patent is extended or adjusted under 35 U.S.C. 154(b) by 274 days.

(21) Appl. No.: 13/479,129

(22) Filed: May 23, 2012

(65) Prior Publication Data

US 2013/0222757 A1      Aug. 29, 2013

Related U.S. Application Data

(60) Provisional application No. 61/519,394, filed on May 23, 2011.

(51) Int. Cl.
  *G02B 3/08*  (2006.01)
  *G02C 7/02*  (2006.01)

(52) U.S. Cl.
  CPC . *G02B 3/08* (2013.01); *G02C 7/022* (2013.01)
  USPC ...................................... 359/743; 351/159.58

(58) Field of Classification Search
  CPC ............ G02C 7/02; G02C 7/022; G02C 7/14; G02C 2202/10; G02C 2202/20; G02B 3/08
  USPC ................. 351/159.58, 159.59; 359/742, 743
  See application file for complete search history.

(56) References Cited

U.S. PATENT DOCUMENTS

| | | | |
|---|---|---|---|
| 2,123,682 A | | 7/1938 | Wingate |
| 3,904,281 A | * | 9/1975 | Jampolsky ............... 351/159.09 |
| 4,077,703 A | | 3/1978 | Pablo |
| 4,647,165 A | | 3/1987 | Lewis |
| 4,792,223 A | | 12/1988 | Axelbaum |
| 4,961,639 A | | 10/1990 | Lazarus |
| 5,002,383 A | * | 3/1991 | Sisler ........................ 351/159.58 |
| 5,005,964 A | | 4/1991 | Berke et al. |
| 5,042,910 A | | 8/1991 | Dolezal |
| 5,170,190 A | * | 12/1992 | Berke ............................ 351/43 |
| 5,173,720 A | | 12/1992 | Lee et al. |
| 5,204,702 A | | 4/1993 | Shapiro |
| 5,258,785 A | | 11/1993 | Dawkins, Jr. |
| 5,619,373 A | | 4/1997 | Meyerhofer et al. |

(Continued)

OTHER PUBLICATIONS

Peli, E., "Field Expansion for Homonymous Hemianopia by Optically Induced Peripheral Exotropia", Optometry and Vision Science, Sep. 2000, vol. 77, No. 9, pp. 453-464; p. 457, paragraph 1, I. 5-8.

(Continued)

*Primary Examiner* — Darryl J Collins
(74) *Attorney, Agent, or Firm* — Thomas M. Freiburger

(57) ABSTRACT

An ergonomic vertical redirection vision system comprises glasses or goggles with lenses modified to include a fresnel prism that vertically redirects light. The curved fresnel prism is a novel curved refractive element with unique advantages compared to a flat fresnel prism. The curved fresnel prism may be achromatized by the addition of an appropriate diffractive surface thereby creating a hybrid achromat or diffractive/refractive optical element (DROE). Looking through the modified eyewear will redirect the user's visual field up or down, depending on the configuration. Upward vision redirection improves ergonomics and aerodynamics for several sports including bicycle riding, swimming, downhill ski racing, and motorcycle racing. Downward vision redirection improves the ergonomics of reading a book, working on a laptop or pad computer, or taking notes in a class.

19 Claims, 5 Drawing Sheets

(56) References Cited

U.S. PATENT DOCUMENTS

| | | | |
|---|---|---|---|
| 5,796,520 A * | 8/1998 | Maruyama | 359/565 |
| 5,801,889 A | 9/1998 | Meyers et al. | |
| 6,003,990 A * | 12/1999 | Einhorn | 351/45 |
| 6,006,367 A | 12/1999 | Webster | |
| 6,142,624 A * | 11/2000 | Morris et al. | 351/159.19 |
| 6,280,031 B1 | 8/2001 | Zerkle | |
| 6,829,088 B2 * | 12/2004 | Ogawa | 359/460 |
| 6,934,084 B2 | 8/2005 | Pandya | |
| 7,374,284 B2 | 5/2008 | Peli | |
| 7,494,219 B2 | 2/2009 | Shahkarami | |
| 7,942,522 B2 | 5/2011 | Sonsino | |
| 2007/0128967 A1 | 6/2007 | Becken et al. | |
| 2010/0315587 A1 | 12/2010 | Leeper | |
| 2011/0115108 A1 | 5/2011 | Berzon et al. | |

OTHER PUBLICATIONS

Giorgi, RG et al., Clinical and Laboratory Evaluation of Peripheral Prism Glasses for Hemianopia., Optom Vis Sci, May 2009, 86(5); 492-502.

Friel, Joe, "Head Up vs. Head Down", print from joefrielsblog.com, Dec. 17, 2010, 3 pages.

Friel, Joe, "Aerodynamic Head Position in Cycling", print from joefrielsblog.com, Mar. 12, 2011, 3 pages.

* cited by examiner

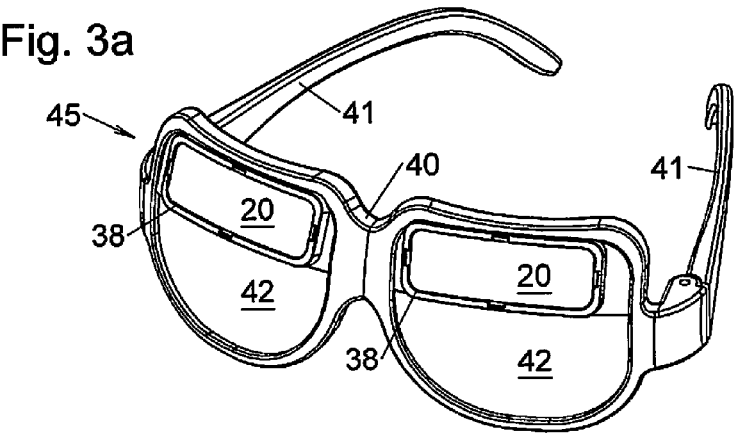
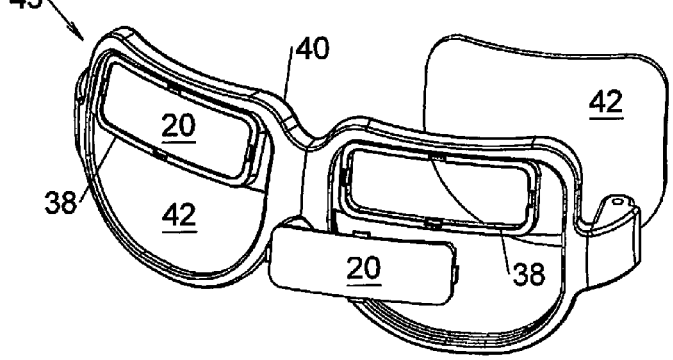
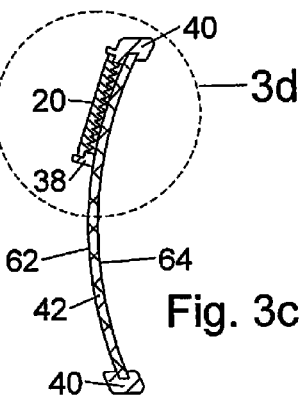
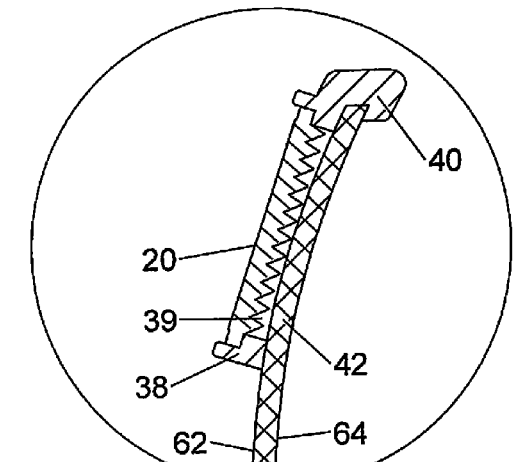

ERGONOMIC VERTICAL VISION REDIRECTION

This application claims benefit of provisional application Ser. No. 61/519,394, filed May 23, 2011.

BACKGROUND OF THE INVENTION

This invention relates to ergonomic eyewear that vertically redirects some portion of the wearer's visual field. Upward vision redirection improves ergonomics for several common sports including bicycling, motorcycle racing, swimming, and ski racing. Downward vision redirection improves the ergonomics of reading a book, working on a laptop or pad computer, or taking notes in a class.

Prior art for vision redirection falls primarily into three categories, sporting glasses for bicycling and swimming that direct vision upward, reading and computer glasses that direct vision downward, and ophthalmic prism correction systems for treating conditions such as diplopia.

Bicycle sunglasses and swimming goggles have long been identified as candidates for improvement by selective upward vision redirection. Many inventions have been proposed to address this perceived need.

U.S. Pat. No. 4,647,165 to Lewis discloses an optical system for bicycle riders. This system redirects vision using triangular prisms mounted to a frame. The frame pivots into the field of vision when the rider is looking down and pivots out of the way when the rider raises his head. These triangular prisms refract and reflect light.

U.S. Pat. No. 6,006,367 to Webster discloses swimming goggles divided into lower and upper panels and water sealed at their junction. The upper panel comprises a rectangular prism, the lower panel a transparent face plate. Light entering the prism's planar top surface is redirected to allow the swimmer to look forward while gazing through the upper panel. Light entering through the transparent lower panel is not vertically redirected.

Several inventions have been proposed that redirect vision and thereby improve the ergonomics of book reading or computer viewing.

U.S. Pat. No. 2,123,682 by Wingate discloses an optical appliance which enables the wearer to view objects situated at an angle to the direct line of vision. The device comprises an eyeglass frame having a pair of rectangular eye-frames, each of which carries a triangular prism constructed and situated in such a way that light entering the prism is refracted on entry, twice internally reflected, and refracted again on exit.

U.S. Pat. No. 4,077,703 by Pablo discloses an optical apparatus enabling a person wearing such apparatus to view objects at an angle to their direct line of vision while the person's gaze is fixed in a substantially direct line of vision. The apparatus is described as comprising prisms, removably attached to a frame which can be worn in front of the eyes or over a pair of reading and/or viewing glasses. These prisms comprise planar optical surfaces and utilize reflection to modify the light path.

U.S. Pat. No. 4,792,223 by Axelbaum describes an optical device worn over the eyes that utilizes a projecting planar reflector that re-reflects a lens reflection. The invention claims to allow simultaneous viewing of two images.

U.S. Pat. No. 5,173,720, Lee et al., discloses an eyewear field-of-view changer that includes an optical frame carrying a pair of highly reflective surfaces that permit a wearer to experience an angular offset between the direct line of vision and the effective line of vision.

U.S. Pat. No. 5,204,702 to Shapiro describes an apparatus and process for relieving eye strain from video display terminals. This system uses triangular prisms to redirect vision horizontally inward, in effect crossing the eyes, to reduce strain on the ocular muscles. These prisms refract light.

U.S. Pat. No. 6,280,031 to Zerkle discloses prismatic optical viewing glasses that afford the wearer a redirected field of vision while retaining peripheral viewing fields. This invention uses triangular prisms mounted on a visor. These prisms refract and reflect light.

U.S. Pat. No. 7,494,219 to Shahkarami discloses eyewear for redirected viewing with auxiliary lenses that provides a redirected view, including a visor configured to support a pair of triangular prisms. These prisms refract and reflect light.

Dolezal U.S. Pat. No. 5,042,910 describes a pair of glasses or goggles with a single prism secured in the field of view for vertically redirecting user's field of view.

The above prior art uses triangular prisms or mirrors to redirect the visual field. None of the devices appears to provide an ideal solution to the problem. Projecting mirrors and prisms add weight, increase wind resistance, are unbalanced and unwieldy.

Ophthalmic applications also use prisms to deviate light. Indeed, prism power is a standard component of eyeglass prescriptions. The prism power prescribes the amount of prismatic deviation (if any) needed to provide comfortable binocular vision.

Besides prisms and mirrors, a fresnel prism can also redirect light. A fresnel prism comprises an array of many small prisms and can be thinner and lighter than a conventional prism of the same power. Fresnel prisms are currently used to treat diplopia (double vision).

3M Corporation produces a product line called Press-On Optics that includes Press-On prisms used to treat diplopia. Press-On prisms are compression molded flat flexible PVC films embossed with a fresnel array of triangular prisms. A Press-On prism is trimmed to size using scissors, wetted with clean water, rotated to the correct orientation, then pressed to the rear surface of the diplopia patient's eyeglass lens where it adheres without other adhesive. Press-On prisms are convenient but deliver relatively poor visual acuity, compared even to other fresnel prisms.

High power prisms, including fresnel prisms, noticeably degrade visual acuity primarily due to chromatic aberration from dispersion. U.S. Pat. No. 6,934,084 by Pandya discloses an ophthalmic prism for diagnosing and correcting visual disorders comprising a transparent refractive prismatic component, a triangular prism or fresnel triangular prisms, combined with a blazed transmission diffraction grating. This composite prism is claimed to reduce chromatic aberration because refractive dispersion and diffractive dispersion operate in opposite directions and can be made to counteract. The prisms taught by this patent have planar optical surfaces with the angle of incidence of light being essentially normal to the lens surface.

What is needed is an unobtrusive, balanced, lightweight, non-projecting, optically optimized system capable of vertically redirecting light while maintaining good visual acuity. For some applications, such as bike riding, a practical system must allow the user to quickly switch back and forth between normal and redirected vision.

Accordingly, several advantages of one or more aspects of the invention are:

(a) to provide an ergonomic vertical redirection vision system in the form of eyeglasses or goggles that allow a user to look up or down, depending on the activity, while keeping the neck in a more neutral position than would otherwise be required;

(b) to provide an ergonomic vertical redirection vision system that maintains good visual acuity;

(c) to provide an ergonomic vertical redirection vision system that closely replicates the form factor of conventional glasses and goggles including such factors as size, weight, balance, and overall appearance;

(d) to provide an ergonomic vertical redirection vision system that adds no moving parts;

(e) to provide an ergonomic vertical redirection vision system that is practical to manufacture;

(f) to provide an ergonomic vertical redirection vision system that may be adapted for use with cycling sunglasses to allow a bicyclist to look forward while keeping the head down;

(g) to provide an ergonomic vertical redirection vision system for bicycling that allows the user to quickly and easily switch back and forth between normal and redirected vision;

(h) to provide an ergonomic vertical redirection vision system that preserves peripheral vision;

(i) to provide an ergonomic vertical redirection vision system that may be adapted for use with swim masks and swim goggles;

(j) to provide an ergonomic vertical redirection vision system that may be adapted for use with motorcycle eyewear to allow a rider or racer to look forward while keeping the head down;

(k) to provide an ergonomic vertical redirection vision system that may be adapted for use with skiing eyewear to allow a racer to look forward while keeping the head down;

(l) to provide an ergonomic vertical redirection vision system that may be adapted for use with plano or positive power reading glasses to allow a user to look downward for reading while keeping the head up;

(m) to provide an ergonomic vertical redirection vision system that may be adapted to allow a user to comfortably view a computer screen placed below optimum height while keeping the head up;

(n) to provide an ergonomic vertical redirection vision system that may be adapted to allow a computer user to easily switch views between a computer screen and a keyboard while keeping the head up;

(o) to provide an ergonomic vertical redirection vision system that may be adapted for use in bifocals;

(p) to provide an ergonomic vertical redirection vision system that may be used by students to simultaneously watch a lecture and take notes without moving the head;

(q) to provide an ergonomic vertical redirection vision system that is practical and inexpensive to manufacture; and (r) to provide an vertical redirection vision system that is easy to clean and practical to maintain.

SUMMARY OF THE INVENTION

An ergonomic vertical redirection vision system comprises glasses or goggles or a mask (all of which are referred to as "glasses" in the claims) with lenses modified to include a fresnel prism panel that vertically redirects light. Looking through the modified eyewear will redirect the user's visual field up or down, depending on the configuration. Downward vision redirection improves the ergonomics of reading a book, working on a laptop or pad computer, or taking notes in a class. Upward vision redirection improves ergonomics for common sports, bicycling, motorcycle racing, swimming, and ski racing. Good neck posture requires a neutral neck position. Time spent with the neck bent, looking up or down, is a form of repetitive stress. Poor neck posture places stress on spinal discs and muscles of the neck and upper shoulder, and contributes to disturbed mechanics in the arm and wrist.

In the preferred embodiment the fresnel panel comprises a hybrid achromat; more specifically a horizontally curved diffractive refractive optical element (DROE). The DROE is mounted concentrically on the upper outside of the lens for upward redirection and on the lower outside of the lens for downward redirection. Light striking the DROE at an oblique angle, typically between 50° and 70°, is redirected to strike the underlying lens at an angle less oblique.

The DROE comprises a fresnel prism that vertically redirects incident light combined with an integrated blazed diffraction grating that counteracts refractive dispersion and adds prismatic power. Light entering the DROE is refracted on entry then refracted and diffracted on exit.

The fresnel prism DROE is typically wider than it is high and, for applications other than flat-lens swim goggles, is preferentially curved in the horizontal plane to mate effectively with curved lenses and to preserve peripheral vision. In these cases the DROE front surface is cylindrical rather than flat as in a traditional fresnel prism.

One way to describe this novel optical element, the diffractive/refractive cylindrical fresnel prism, is to individually describe each of its characteristics.

A fresnel array of prisms is a refractive element made up of many small prisms, each with the same vertex angles as the large prism mimicked by the array. Fresnel prisms are lighter and thinner than solid prisms and provide more constant light transmission as compared to the varying losses of a solid prism. Fresnel prisms are defined by the angles of the two faces and by the number of prisms per distance unit (e.g. prisms per mm). Cylindrical fresnel prisms have curved front and rear surfaces. In the preferred embodiment, the cylindrical axes are at right angles to the length of the fresnel facets, and generally perpendicular to the viewing direction, so that if the peaks of the fresnel facets run horizontally then the axes are vertical. The radius of curvature of the smooth front face is typically greater than the radius of curvature of the faceted rear face, and with a rearwardly displaced axis of curvature. The difference in curvature depends on several factors including the base curve, the deviation angle, and the expected incident angle of light striking the DROE front surface. The incident angle is affected by the lens shape, the lens frame shape, and the angle at which the DROE is mounted. The cylindrical fresnel prism is a novel optical component having unique advantages for vertical vision redirection.

High power refractive prisms, including triangular, flat fresnel, and cylindrical fresnel prisms, noticeably degrade visual acuity due to the chromatic aberration caused by dispersion. Dispersion, quantified by the Abbe number, varies by material but is always a positive number for most refractive materials in the visible. A technique to counteract refractive chromatic aberration is to add a diffractive optical element. This is possible because diffractive surfaces exhibit negative optical dispersion, i.e. have negative effective diffractive Abbe numbers. Adding a diffractive surface to the refractive prism reduces or eliminates chromatic aberration of the refractive prism and also provides additional prismatic power. It is possible to fabricate the diffractive element directly on the surface of the refractive. These and other objects, advantages and features of the invention will be apparent from the following description of a preferred embodiment, considered along with the accompanying drawings.

DESCRIPTION OF THE DRAWINGS

FIG. 3a is a front perspective view of ergonomic sunglasses or other eyeglasses.

FIG. 3b is a front perspective view of partially disassembled ergonomic sunglasses.

FIG. 3c is a side section view of ergonomic sunglasses.

FIG. 3d is a detail view of FIG. 3c.

DESCRIPTION OF PREFERRED EMBODIMENTS

Figure 1A:
FIG. 1a is a top view of a curved fresnel prism.

FIG. 1a is a top view of a curved fresnel prism 20 molded from a suitable optical material such as acrylic or possibly even glass. The prism 20 comprises a cylindrical front face 22 and a plurality of fresnel facets 24 on the back side. Surface 22 is essentially cylindrical with its axis at right angles to the length of the fresnel facets. Optical element 20 is thinner in the middle and thicker at the ends because the front cylindrical surface 22 has a larger radius than do the rear facets and the cylindrical axis of the face 22 is rear of the facets axis. The cylindrical shape, besides mating well with meniscus lenses, reduces horizontal line curvature that is apparent when viewing through a flat fresnel prism panel. The front surface radius is calculated using optical design software, such as ZEMAX (offered by ZEMAX Development Corporation, Bellevue, Wash.) to correct astigmatism across the field induced by the rear face. The optimization techniques are specified in the ZEMAX documentation and will not be further described herein.

Figure 1B:
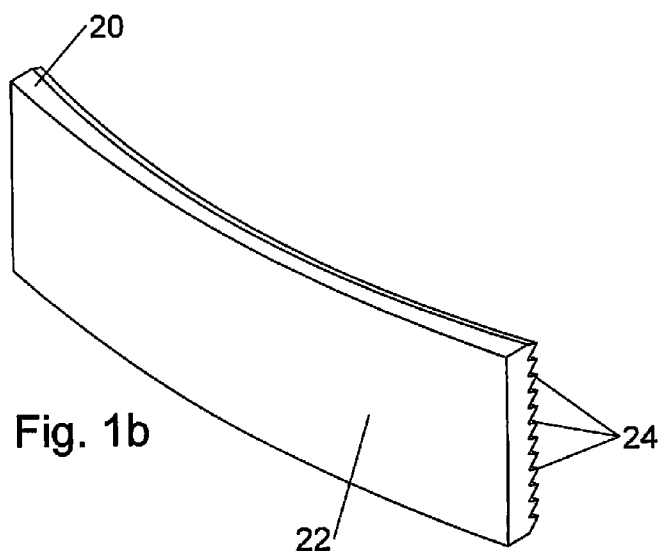
FIG. 1b is a front perspective view of a curved fresnel prism.

FIG. 1b is a front perspective view of curved fresnel prism 20. Light entering front face 22 and exiting facets 24 is redirected upward at an angle determined by the incident angle of the rays, the prism facet angles, and the refractive index of the prism material.

Figure 1C:
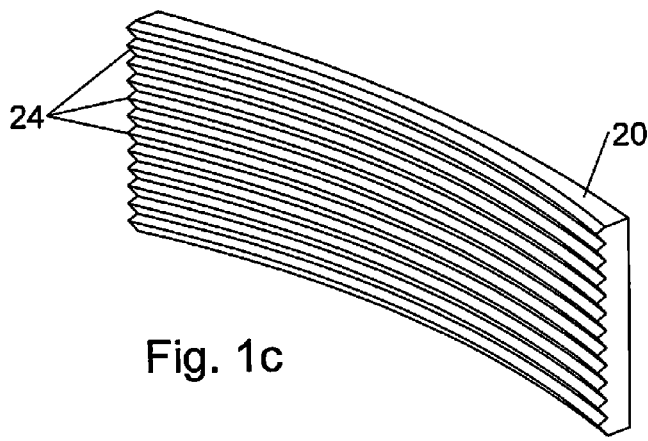
FIG. 1c is a back perspective view of a curved fresnel prism.

FIG. 1c is a back perspective view of curved fresnel prism 20 showing the fresnel facets 24 in more detail. The facets are parallel and all have the same height and slope. A properly sized cylinder, placed in contact with the element's rear surface, would contact the peak of every facet along its entire length. The fresnel surfaces themselves are circular conical surfaces.

Figure 2A:
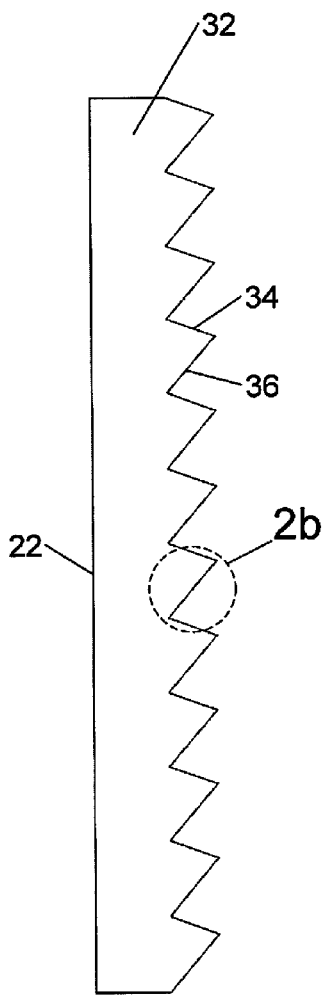
FIG. 2a is a two-dimensional profile view of a hybrid fresnel prism.

FIG. 2a shows a two-dimensional hybrid prism profile 32. Profile 32, swept through a circular arc, creates a curved fresnel prism similar to the prism 20 in FIG. 1a-c. The fresnel sawtooth shape of each fresnel prism is formed by an unused fresnel face 34 and an optical fresnel face 36. Optical face 36, though it appears to be a straight line, actually is itself a sawtooth pattern that defines a blazed diffraction grating. The unused faces 34 are approximately parallel to light rays passing through the device 32.

Figure 2B:
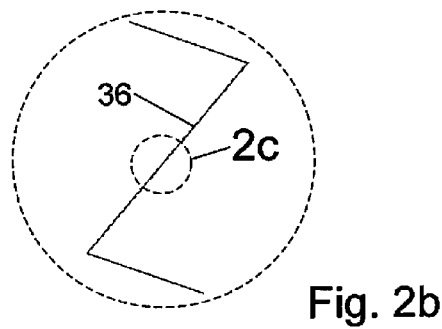
FIG. 2b is a detail view of FIG. 2a showing a single fresnel facet.

FIG. 2b is a detail view of FIG. 2a showing a single fresnel facet. In this view, face 36 still appears to be a straight line.

Figure 2C:
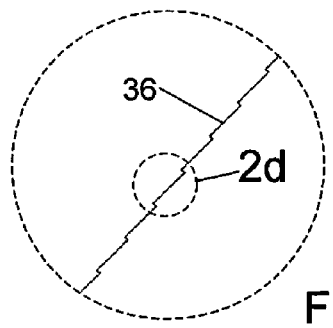
FIG. 2c is a detail view of FIG. 2b showing a blazed diffraction grating inscribed on the fresnel facet.

FIG. 2c, a detail view of FIG. 2b, reveals the sawtooth shape of face 36 defining a blazed diffraction grating inscribed on the fresnel facet. Placing the diffractive element directly on the refractive surface has several advantages including simplifying mechanical alignment of the two elements.

Figure 2D:
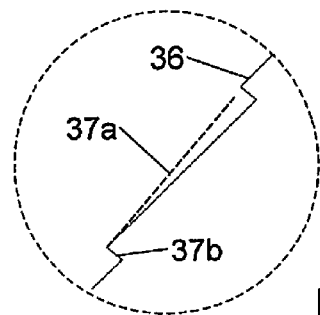
FIG. 2d is a detail view of FIG. 2c showing a single grating element.

FIG. 2d is a detail view of FIG. 2c showing a single grating element. A shallow blaze angle 37a is generally in the range of 0.5° to 5° from the overall facet surface and a step angle 37b optimally is 90°. The grating frequency is in the neighborhood of 20 to 50 grooves per millimeter. A blazed transmission grating concentrates most light into a single diffraction order, typically the first order. Blazed gratings often have a sawtooth profile, as illustrated in these figures, but not all blazed gratings have this shape. The term "blazed" refers to high diffraction efficiency obtained by the concentration of light into a single diffraction order (as in a "blaze of light") and not to the physical shape of the grating. For this reason it is not correct to say that all blazed gratings have triangular profiles, or that all blazed gratings are ruled gratings. Some holographic gratings, for example, may exhibit blazing characteristics.

The diffraction grating superimposed on the refractive prism creates a hybrid diffractive/refractive optical element (DROE) or, more specifically, a diffractive/refractive curved fresnel prism (DRCFP). The DRCFP displaces light to a greater degree than a pure refractive, but the primary reason for using hybrid optics is to achromatize the lens. Using hybrid optics to achromatize a lens is becoming a conventional technique. This achromatization is possible because the Abbe numbers of refractives and effective Abbe number of diffractives have opposite signs. The technique depends on designing a diffractive structure that precisely counteracts the spectral dispersion of the refractive prism. Since the spectral dispersion of diffractives is much stronger than that of refractives, the DRCFP has 10-20 times more refractive power than diffractive power. Acrylic, for example, has Abbe number 57 while diffractives have an effective Abbe number −3.45.

Software systems, such as ZEMAX, mentioned above, can be used to design, analyze, and optimize diffractive surfaces and to calculate the parameters, such as blaze angle and frequency, required when drafting the manufacturing specification.

Detailed explication of grating technology is beyond the scope of this document but is described in standard reference works such as "Diffraction Gratings and Applications" by E. G. Lowen and E. Popov, Published by Marcel Dekker, Inc. (1997).

The diffractive/refractive curved fresnel prism has been designed, simulated using Zemax, and advantageously can be injection/compression molded using cyclo olefin polymer Zeonex E48R. Zeonex is offered for sale by Zeon Chemicals L.P. located in Louisville, Ky. The DRCFP is 42 mm wide, 13.8 mm high, approximately 2.5 mm thick (varies). The front surface is cylindrical with a radius of 79 mm. The fresnel front surface is overall cylindrical with a radius of 64 mm at the tooth base (63.01 mm at the peaks). The fresnel angles are 40° for the optical face and 72° for the unused face. The diffraction grating angle is 1.76° and the spacing is 0.02849 mm. This is one example of a preferred embodiment using the material Zeonex, and all dimensions and angles can vary, including as to different materials.

FIG. 3a is a front perspective view of a pair of ergonomic sunglasses 45 (which could be other forms of glasses). A sunglass frame 40 attaches to the head with a set of temples 41. A pair of sunglass lenses 42 (or plain or corrective lenses) are mounted in frame 40. Curved fresnel prism panels 20 are mounted outside sunglass lenses 42 using a pair of integral prism perimeter frames 38. Prism frames 38 are preferably (but not necessarily) opaque to block unwanted light. To minimize parallax issues, the curved fresnel prism panels should be mounted in such a way that the separation between the centers of left and right panels 20 corresponds to the wearer's interpupillary distance and both panels should be oriented to point in the same direction both horizontally and vertically.

The panels shown in the drawings are identical for left and right and for that reason have bilateral symmetry about a vertical plane. However, non-symmetrical designs have been produced that, for example, extend through a greater arc width to the outside than to the inside, so that a left lens would extend through a wider arc to the left and the right lens through a wider arc to the right. This asymmetry enables a wider peripheral field of view. Asymmetric designs are matched to the interpupillary distance, and left and right panels point in the same horizontal and vertical directions, but the area in front of the pupil is not at the center of the panel.

The front surface of the prism panel may be coated. Coatings include antireflective, scratch resistant, hydrophobic, oleophobic, UV blocking, blue blocking, polarizing, and others. An opaque coating (such as copper oxide) may be applied to the unused fresnel faces, and to other areas such as the prism panel perimeter, to block light transmission to reduce unwanted artifacts.

The ergonomic glasses are configured as impact safety lenses because lenses 42, when formed from a shatter resistant polymer such as polycarbonate, act as barriers to shield the eye from prism fracture or ejection. The prism typically is molded from a polymer such as acrylic that has excellent optical characteristics but, compared to polycarbonate, poor shatter resistance.

Although the prism panels are shown in front of the eyeglass lens, they may be integrated into, or in back of the primary lens depending on what works best for each application. When integrated into an eyeglass lens, the front surface, usually cylindrical, may be conical, spherical, or aspherical, though the fresnel facets preferentially retain their conical surface shape.

FIG. 3b is a front perspective view of partially disassembled ergonomic sunglasses showing dismounted prism panel 20 and lens 42. Prism panel 20 is preferentially a hybrid achromat and may be manufactured using injection/compression molding technology from suitable optical polymers.

FIG. 3c is a side section view of ergonomic glasses or sunglasses that shows the orientation of the sunglass lens and prism panel. Note that the prism panel is tilted from the vertical by the curvature of the sunglass lens. A meniscus lens having an outer curvature 62 equal to an inner curvature 64 has no vergenge and is referred to as a plano lens. A meniscus lens with outer curvature radius 62 less than inner curvature radius 64 has positive power; a lens with outer curvature radius greater than inner curvature radius has negative power. The base curve of a sunglass lens varies, but an 8 diopter (8D) base curve is typical. A meniscus lens with an optimal base curve is referred to as the best-form. For a plano lens the best-form is about 8D. Vertical redirection is not limited to plano lenses; it works equally well for positive and negative power lenses.

FIG. 3d is a detail view of FIG. 3c. Frame 40 and frame 38 surround prism panel 20 hermetically sealing the hybrid fresnel surface to prevent contamination. Note that there is an air gap 39 between the prism panel and lens.

Light passing through the fresnel prism panels is deflected upward at an angle specified by the strength of the prism, typically 15 to 30 degrees (26 to 52 prism diopters). Light passing through the lower part of the lens is not deflected. Although not illustrated, upward vision redirection technology may also be applied to swim/scuba eyewear (masks and goggles), motorcycle eyewear (masks, goggles, and sunglasses), and downhill ski racing eyewear (masks, goggles, and sunglasses). Vertical vision redirection confers advantages for swimmers, motorcycle riders, and downhill skiers analogous to the advantages conferred to bicyclists. The terms glasses and eyeglasses are intended to refer to masks and goggles as well.

Swim/scuba masks and goggles possess a sealing flange around the lens perimeter that presses against the facial skin to seal the mask interior against water. Rather than earpieces, masks and goggles are generally held on the head using straps.

Downward vision redirection may be used to improve the ergonomics of reading a book, working on a laptop or pad computer, or taking notes in a class. Plano, positive power lenses (correct for hyperopia or presbyopia), or negative power lenses (correct for myopia) may be integrated with curved fresnel prisms mounted at the bottom of the glasses frame. The prism panel may cover all or only a portion of the lens. For applications requiring far vision correction, or in other situations where it proves suitable, the prism may be integrated into a bifocal with a lower prism section and an upper lens section. Light passing through the fresnel prism panels is deflected downward at an angle specified by the strength of the prism, typically 15 to 30 degrees (26 to 52 prism diopters). Light passing through the main part of the lens is not deflected. The power and other lens characteristics may implement an individual wearer's vision correction prescription.

Figure 4:
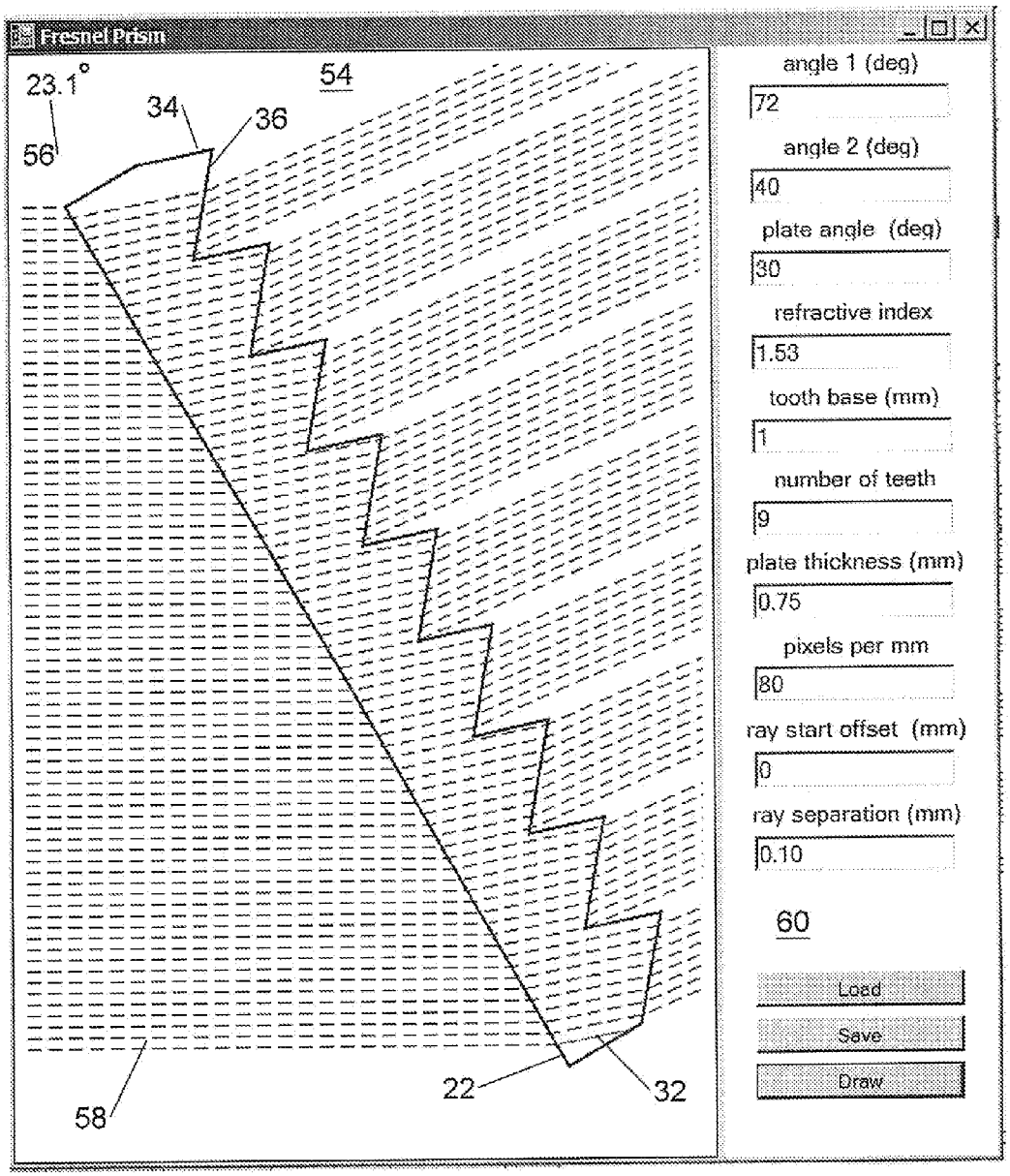
FIG. 4 shows output from fresnel prism simulation software.

FIG. 4 shows output from a special purpose computer program that simulates a fresnel prism. A graphics area 54 shows a set of light rays 58 refracted as they enter the front surface 22 of prism profile 32 and refracted again as they exit fresnel face 36. A calculated angle 56 indicates total refraction of the rays. The angle of the unused faces 34 is calculated to minimize the amount of light from the critical direction (light that would enter the wearer's pupil) that strikes that (unused) face. A data entry area 60 lists simulation parameters such as fresnel angles, front face angle (plate angle), refractive index, etc.

Figure 5:
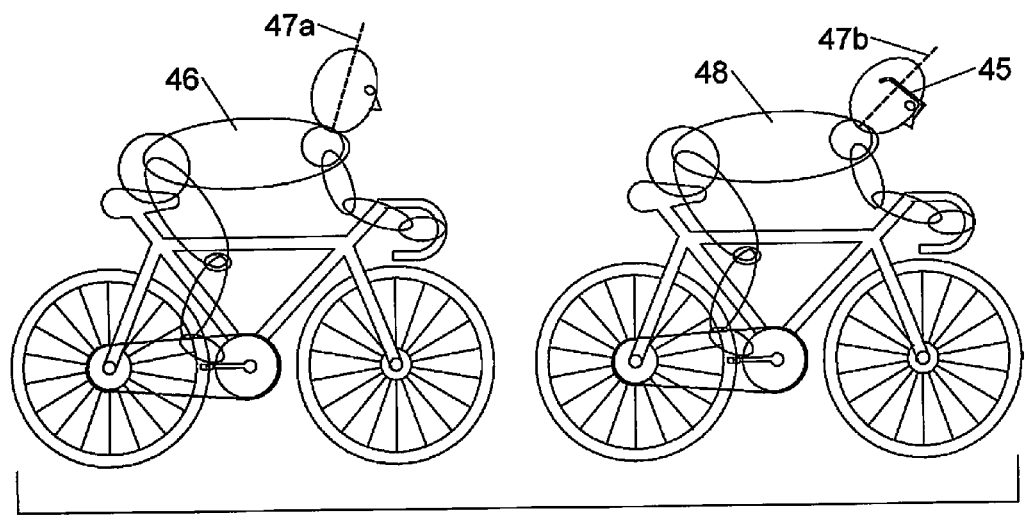
FIG. 5 is profile view showing bike rider ergonomics.

FIG. 5 is a schematic profile view comparing the head position of a bike rider 48 wearing upward vision redirection glasses 45 compared to a rider 46 not wearing redirection glasses. A bicycle rider needs to keep his head up so he (or she) can see forward in order to navigate, but maximum speed and efficiency are generally attained when the head is kept as low as possible. The athlete can choose to look forward while keeping the head down by gazing upward through the prism panel or to raise the head and look forward without redirection.

Recent wind tunnel tests indicate a 1.4% decrease in drag when the head is held down compared with the more usual head-up position. That amounts to about a 51-second time saving in a 1-hour bike race. Without vertical vision redirection, racing in the head-down position is not safe. Riders have been injured, some seriously, in collisions caused by failure to watch forward while riding head-down.

Figure 6:
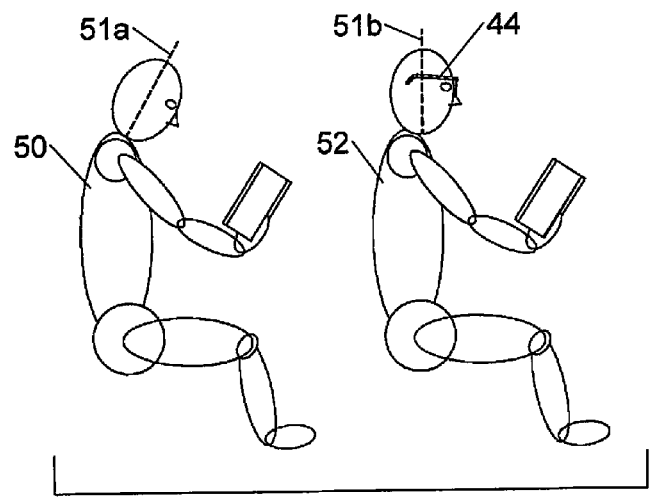
FIG. 6 is a profile view showing book reader ergonomics.

FIG. 6 is a profile view of comparing the head position of a book reader 52 wearing a pair of downward vision redirection glasses 44 compared to a reader 50 not wearing redirection glasses. The reader 50 has the neck bent at an angle that puts unhealthy strain on the musculature and spine. Downward vision redirection improves the ergonomics of reading a book, working on a laptop or pad computer, or taking notes in a class. A DRCFP created with a polarized surface or mounted atop a polarized base lens may be particularly suited for viewing LCD screens of laptops and pad computers. LCD displays are polarized so a compatible polarization of the eyeglasses may prove to reduce glare and confer other benefits.

Hours, and eventually months and years, spent with the neck bent, looking up or down, is a form of repetitive stress. Over time, this stress causes damage that manifests as inflammation and intractable chronic pain.

Applications of the invention exist that benefit by using a curved fresnel prism to deviate light at angles other than the vertical. For example, the DRCFP may be utilized as an ophthalmic prism for diagnosing and correcting visual disorders such as diplopia.

Although the description above contains many specifities, these should not be construed as limiting the scope of the invention but as merely providing illustrations of some of the presently preferred embodiments of the invention.

For example, the prisms are shown attached to or integrated into standard reading or sunglass or other lenses. The prisms could instead be suspended into the user's field of view from a visor or helmet.

Although the prisms are shown as fixed immovably to the lens or frames of glasses or sunglasses, they might also be attached via a hinge so that they could be swiveled down into the user's field of view or rotated up out of view. The prisms could also be attached removably with clips, suction cups, magnets, or other means.

Although the fresnel prisms are shown oriented so that light enters a smooth surface and exits from the faceted surfaces, the fresnel prisms could be reversed so that light enters through the faceted side.

Although the fresnel facets are shown as circular conical surfaces $(x^2/a^2+y^2/a^2-z^2/c^2=0)$, certain applications may benefit from the useof elliptical or other non-circular conical surfaces $(x^2/a^2+y^2/b^2-z^2/c^2=0)$. Circular cylindrical surfaces $(x^2/a^2+y^2/a^2=1)$ and non-circular cylindrical surfaces $(x^2/a^2+y^2/b^2=1)$, as well as other curve shapes, have been designed but inscribing a grating can be difficult. Spherical and aspherical surfaces have been designed but have several disadvantages: they are difficult to manufacture, inscribing a grating is difficult, and they generate astigmatism unless the vertical angle of incidence is narrowly range restricted. However, although difficult to manufacture, an acylinder surface may help astigmatism.

Although the diffraction grating used to achromatize the prism is shown superimposed on the curved exit facets, the diffraction grating could be placed at the front or entry surface, though that diffractive surface would need to be protected from damage. Likewise, the grating could be placed on the front surface of the underlying lens or shield.

Rather than an air gap between the prism and the shield, a material with a low refractive index could be applied to the rear of the prism to replace the air gap and shield. Alternatively, the shield could be left completely off a strictly refractive prism, though the fresnel facets would be hard to clean.

The above described preferred embodiments are intended to illustrate the principles of the invention, but not to limit its scope. Other embodiments and variations to this embodiment will be apparent to those skilled in the art and may be made without departing from the spirit and scope of the invention as defined in the following claims and their legal equivalents.

We claim:

1. A curved fresnel prism panel positioned to vertically redirect light rays passing through the prism panel, the fresnel prism panel comprising a suitable optical material element with an array of horizontal parallel prisms on the optical material element, and the optical material element being horizontally curved such that the parallel prisms are horizontally curved, the optical material element on an inner side having a first radius of curvature and at an outer side having a second radius of curvature, larger than the first and with a displaced center of curvature such that the optical material element is thicker at left and right sides than at its middle.

2. The fresnel prism panel of claim 1, including a diffraction grating positioned to reduce chromatic aberration and to increase prismatic power of the fresnel prism panel.

3. The fresnel prism panel of claim 1, wherein each of the array of parallel prisms has two facets, one being a surface essentially aligned with a light path into the panel and unused and the other passing light to be refracted.

4. The fresnel prism panel of claim 3, wherein the prism facets that pass light are conical surfaces.

5. The fresnel prism panel of claim 3, wherein the unused fresnel facets are coated with an opaque material.

6. The fresnel prism panel of claim 1, wherein the fresnel prism panel shifts the angle of light rays passing through the panel by at least 10°.

7. The fresnel prism panel of claim 1, wherein the fresnel prism panel shifts the angle of light rays passing through the panel by at least 20°.

8. The fresnel prism panel of claim 1, wherein the fresnel prism panel has prism power in the range of 26 to 52 diopters.

9. The curved fresnel prism panel of claim 1, wherein the prism is mounted on an eyeglass frame, wherein the prism panel is positioned to bend light rays passing through the prism to the user's eye by at least 5° so that the wearer sees a field of view at a shifted angle from the direct line of vision of the wearer's eyes.

10. The curved fresnel prism panel of claim 9, including lenses for normal vision secured in the eyeglass frame, and wherein the lenses for normal vision extend throughout the eyeglass frame, with the fresnel prism overlaid over a part of a lens. vision by at least 20°.

11. The curved fresnel prism panel of claim 10, wherein the lenses for normal vision are sunglass lenses.

12. The curved fresnel prism panel of claim 10, wherein the lenses for normal vision are corrective lenses.

13. The curved fresnel prism panel of claim 10, wherein the lenses for normal vision are reading lenses, and wherein the fresnel prism panel is positioned at a bottom portion of the eyeglass frame.

14. The curved fresnel prism panel of claim 10, wherein the fresnel prism panel is positioned at a bottom portion of the eyeglass frame.

15. The curved fresnel prism panel of claim 10, wherein the lenses for normal vision are bifocal, with reading lenses at a bottom portion of the eyeglass frame, adjacent to the fresnel lens panel.

16. The curved fresnel prism panel of claim 10, wherein the lenses for normal vision have optical coatings.

17. The curved fresnel prism panel of claim 9, wherein the fresnel prism panel is mounted onto the eyeglass frame and lens with a prism frame, such that the series of parallel prisms, at the rear of the fresnel prism panel adjacent to the lens, is hermetically sealed for protection.

18. The curved fresnel prism panel of claim 9, wherein the fresnel prism panel shifts the angle of a user's vision by at least 20°.

19. The curved fresnel prism panel of claim 1, incorporated in swimming goggles, and wherein the fresnel lens panel occupies only an upper part of the goggles.

* * * * *